(12) United States Patent
Huang et al.

(10) Patent No.: US 8,503,105 B2
(45) Date of Patent: Aug. 6, 2013

(54) ZOOMING ADJUSTMENT MECHANISM AND PROJECTION LENS MODULE

(75) Inventors: Chien-Chang Huang, Hsin-Chu (TW); Fan-Chieh Chang, Hsin-Chu (TW)

(73) Assignee: Coretronic Corporation, Hsin-chu (TW)

( * ) Notice: Subject to any disclaimer, the term of this patent is extended or adjusted under 35 U.S.C. 154(b) by 0 days.

(21) Appl. No.: 13/285,661

(22) Filed: Oct. 31, 2011

(65) Prior Publication Data

US 2012/0194919 A1    Aug. 2, 2012

(30) Foreign Application Priority Data

Jan. 28, 2011    (CN) .......................... 2011 1 0034995

(51) Int. Cl.
*G02B 15/14*    (2006.01)

(52) U.S. Cl.
USPC ........................................ 359/701; 359/694

(58) Field of Classification Search
USPC ...... 359/694, 696–704, 808–826; 396/72–75, 396/85, 349–350
See application file for complete search history.

(56) References Cited

U.S. PATENT DOCUMENTS

| 7,253,967 B2 * | 8/2007 | Wang et al. ................... 359/696 |
| 7,466,504 B1 * | 12/2008 | Koyama ........................ 359/819 |
| 2009/0128931 A1 * | 5/2009 | Matsumoto ................... 359/823 |

FOREIGN PATENT DOCUMENTS

| TW | I279639 | 4/2007 |
| TW | M339013 | 8/2008 |
| TW | 200938937 | 9/2009 |

* cited by examiner

*Primary Examiner* — Darryl J Collins
*Assistant Examiner* — Gary O'Neill
(74) *Attorney, Agent, or Firm* — Muncy, Geissler, Olds & Lowe, PLLC

(57) ABSTRACT

A zooming adjustment mechanism including a holder, a zoom ring, at least two rollers, a first resilient sheet, and a second resilient sheet is provided. The zoom ring is confined to the holder and coupled to a zoom bar. The rollers are respectively confined to a groove of the holder and in contact with a bottom surface of the zoom ring. The first resilient sheet is disposed on a first side of the holder, and each end of the first resilient sheet leans against a roller. The second resilient sheet is disposed on a second side of the holder, and each end of the second resilient sheet leans against a roller. A projection lens module including the zooming adjustment mechanism is also provided.

13 Claims, 4 Drawing Sheets

ZOOMING ADJUSTMENT MECHANISM AND PROJECTION LENS MODULE

BACKGROUND OF THE INVENTION a. Field of the Invention

The invention relates to a zooming adjustment mechanism and a projection lens module having the zooming adjustment mechanism.

b. Description of the Related Art

Taiwan patent no. TWM339013 discloses a conventional turning mechanism used for projector. Referring to FIG. 1, a zoom projection lens 210 is mounted on a holder 200, and a turning mechanism 100 is used to turn a zoom bar 212 of the zoom projection lens 210. The turning mechanism 100 includes a fixed element 110 and a movable element 130. The fixed element 110 is fastened to the holder 200 and has a pair of sliding tracks 112. The movable element 130 has a pair of sliding edges 132 and a pair of hooks 134. The movable element 130 is clipped to the sliding tracks 112 through the hooks 134, and the sliding edges 132 lean against the sliding tracks 112 to allow the movable element 130 to slide around an optical axis R of the zoom projection lens 210 and relative to the fixed element 110 so as to turn the zoom bar 212. However, though the turning mechanism 100 allows for an adjustment to the focal length of the zoom projection lens 210, such design fails to provide smooth feel when a user pokes the movable element 130 to adjust the focal length of the zoom projection lens 210. In an alternate conventional design, a Teflon sheet is adhered to a surface of the holder 200 by a backing adhesive, and the movable element 130 slides on the Teflon sheet to provide smooth feel during a poke operation. However, as time goes on, the Teflon sheet is gradually worn out to fail to provide smooth feel. Besides, the backing adhesive is liable to peel off as a result of high usage frequency.

Taiwan patent publication no. TW200938937 discloses a zooming adjustment mechanism for a projector. The zooming adjustment mechanism has an adjusting ring, a transmission gear and a driving ring engaging with each other to adjust the focal length of a lens module in a lens barrel. Further, Taiwan patent no. TWI279639 discloses a magnification-adjusting mechanism to adjust the magnification of a projection lens. The magnification-adjusting mechanism is installed outside and around a lens barrel and includes an adjusting ring and a roller. The adjusting ring is installed outside the lens barrel in a rotatable manner relative to the lens barrel, and a slot is formed on the adjusting ring. The roller is installed between the adjusting ring and the lens barrel.

BRIEF SUMMARY OF THE INVENTION

The invention provides a zooming adjustment mechanism and a projection lens module having the zooming adjustment mechanism. The zooming adjustment mechanism has at least one of the advantages of smooth hand feel, high stability in zooming operations and dust-proof.

Other advantages and objects of the invention may be further comprehended through the technical features disclosed in the invention. In order to achieve one or part of or all the objectives or other objectives, a zooming adjustment mechanism according to an embodiment of the invention includes a holder, a zoom ring, at least two rollers, a first resilient sheet and a second resilient sheet. The holder has at least two grooves, and the zoom ring is confined to the holder and coupled to a zoom bar. The zoom ring has a top surface, a bottom surface opposite the top surface, a first side surface and a second side surface opposite the first side surface. The rollers are respectively confined to the grooves of the holder and in contact with the bottom surface of the zoom ring. The first resilient sheet is disposed on a first side of the holder, and each of the two ends of the first resilient sheet leans against one of the rollers. The second resilient sheet is disposed on a second side of the holder, and each of the two ends of the second resilient sheet leans against one of the rollers.

In one embodiment, the zooming adjustment mechanism further includes a top cover connected with the holder and covering the zoom ring.

In one embodiment, the bottom surface of the zoom ring is complementary to the rollers in shape, and at least one rib structure is formed on the bottom surface of the zoom ring. Each of the rollers has at least one slot formed in a position corresponding to the rib structure.

In one embodiment, a stop-slip texture is formed on the top surface of the zoom ring, and the holder has two stop portions opposite to each other.

In one embodiment, the zoom ring has an engaging structure engaging with one end of the zoom bar.

Another embodiment of the invention provides a projection lens module including a projection lens and the above zooming adjustment mechanism. The projection lens has a zoom bar, the zooming adjustment mechanism is mounted on the projection lens, and a zoom ring of the zooming adjustment mechanism is coupled to the zoom bar.

In summary, the embodiment or the embodiments of the invention may have at least one of the following advantages. According to the above embodiments, the zoom ring is capable of sliding on the rollers to allow a user to poke the zoom ring more smoothly. Besides, the elastic force of the resilient sheets allows for resilient hand feel when a user pokes the zoom ring. Further, since the rollers are confined to the grooves, such that the rollers does not slip off and the zoom ring does not vibrate when a user pokes the zoom ring. Therefore, the stability in zooming operations is improved. Also, the top cover together with the holder surround the zoom ring to provide dust-proof protection.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
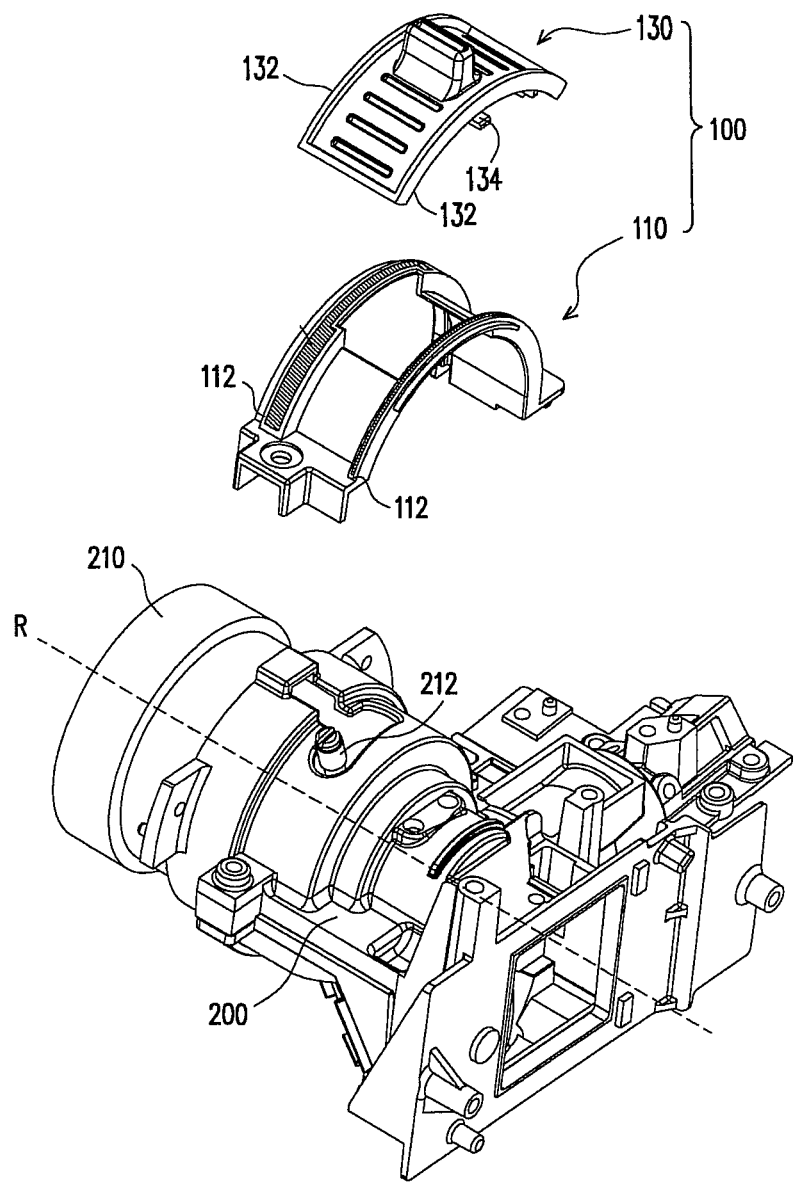
FIG. 1 shows an exploded diagram illustrating a conventional turning mechanism for a projector.
Figure 2:
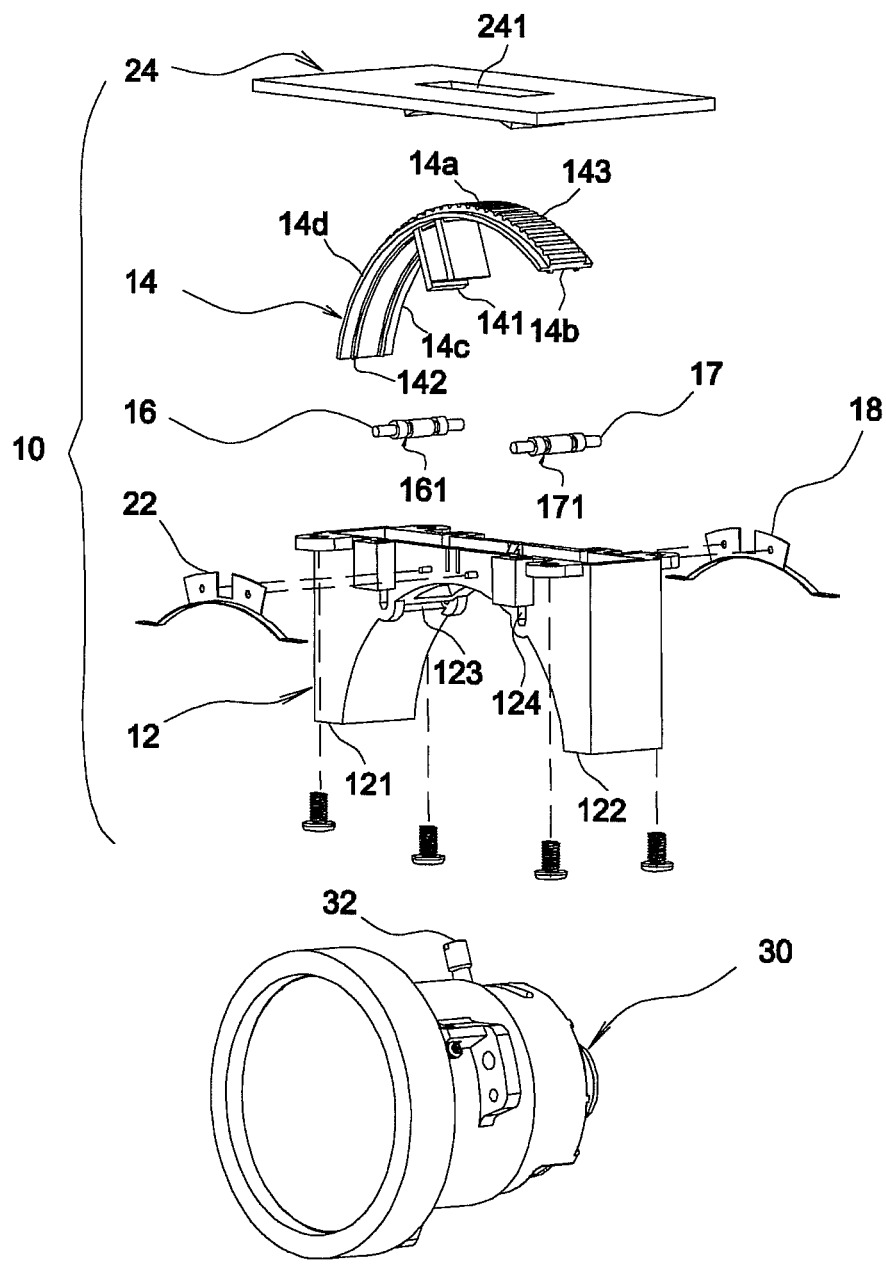
FIG. 2 shows an exploded diagram of a zooming adjustment mechanism according to an embodiment of the invention.
Figure 3:
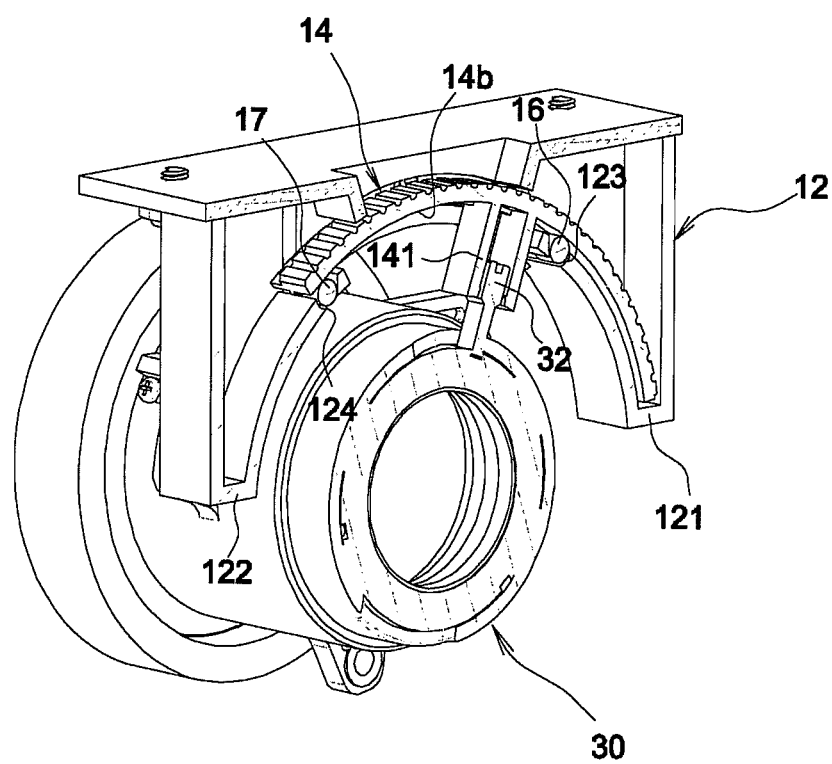
FIG. 3 shows a projection lens module according to an embodiment of the invention for illustrating an assembled zooming adjustment mechanism mounted on a projection lens.

FIG. 2 shows an exploded diagram of a zooming adjustment mechanism according to an embodiment of the invention. FIG. 3 shows a projection lens module according to an embodiment of the invention for illustrating an assembled zooming adjustment mechanism mounted on a projection lens. Referring to both FIG. 2 and FIG. 3, the zooming adjustment mechanism 10 includes a holder 12, a zoom ring 14, at least two rollers 16 and 17, a first resilient sheet 18, a second resilient sheet 22 and a top cover 24. The zooming adjustment mechanism 10 is mounted on a projection lens 30 to form a projection lens module 40. The holder 12 has a space for the zoom ring 14, and the space allows the zoom ring 14 to slide inside the holder 12. Stop portions 121 and 122 are respectively formed on two opposite sides of the holder 12 to limit the extent of a sliding movement of the zoom ring 14. The zoom ring 14 is confined to the holder 12 and slidably coupled to a zoom bar 32 of the projection lens 30. For example, the zoom ring 14 may have an engaging structure 141 that engages with one end of the zoom bar 32. Therefore, a user may poke the zoom ring 14 with his fingers to drag the zoom bar 32 to adjust the focal length of the projection lens 30. The zoom ring 14 has a top surface 14a, a bottom surface 14b opposite the top surface 14a, a first side surface 14c, and a second side surface 14d opposite the first side surface 14c. The holder 12 has at least two grooves 123 and 124, and the roller 16 and the roller 17 are respectively confined to the groove 123 and the groove 124. The rollers 16 and 17 are in slidably contact with the bottom surface 14b of the zoom ring 14. That is, the zoom ring 14 may slide on the rollers 16 and 17 to allow a user to poke the zoom ring 14 more smoothly.

Figure 4:
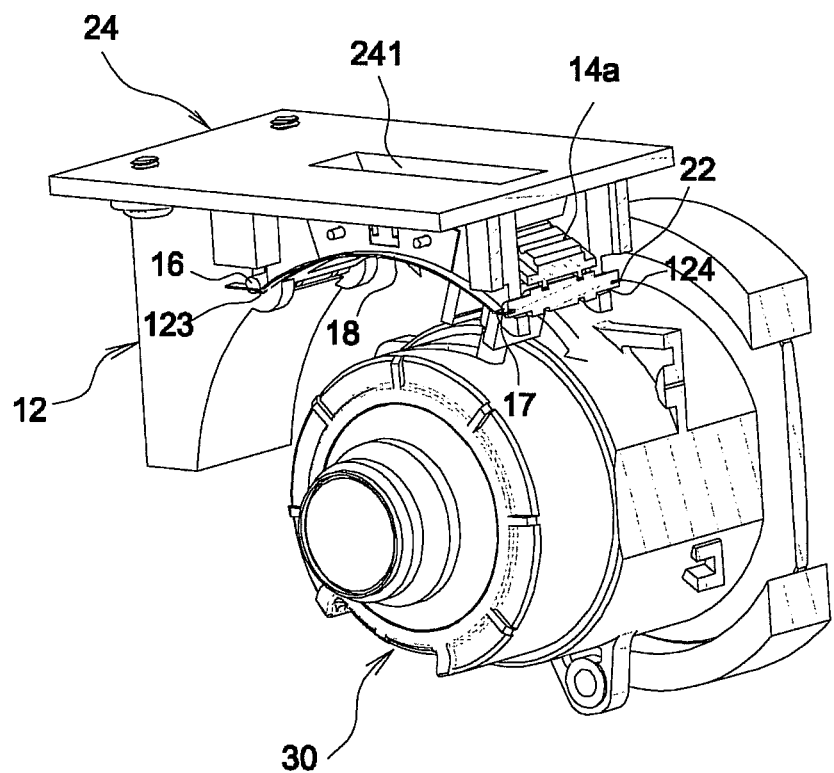
FIG. 4 shows the projection lens module observed from another viewing angle.

FIG. 4 shows the projection lens module from another viewing angle. Please refer to both FIG. 2 and FIG. 4, the first resilient sheet 18 is attached to a first side of the holder 12, a middle part of the first resilient sheet 18 is fixed on the holder 12, and two opposite ends of first resilient sheet 18 respectively lean against the roller 16 and the roller 17. Further, the second resilient sheet 22 is attached to a second side of the holder 12 opposite the first side of the holder 12, a middle part of the second resilient sheet 22 is fixed on the holder 12, and two opposite ends of the second resilient sheet 22 respectively lean against the roller 16 and the roller 17. The elastic force of the first resilient sheet 18 and the second resilient sheet 22 allows for resilient hand feel when a user pokes the zoom ring 14. Further, since the rollers 16 and 17 are confined to the grooves 123 and 124, such that the rollers 16 and 17 do not slip off and the zoom ring 14 does not vibrate when a user pokes the zoom ring 14. Therefore, the stability in zooming operations is improved. Besides, the top cover 24 is connected with the holder 12 and covers the zoom ring 14. That is, the top cover 24 together with the holder 12 surround the zoom ring 14 to provide dust-proof protection. Also, an opening 241 is formed on the top cover 24 to allow a user to touch the zoom ring 14.

In one embodiment, the bottom surface 14b of the zoom ring 14 is complementary to the rollers 16 and 17 in shape. For example, as shown in FIG. 2, at least one rib structure 142 is formed on the bottom surface 14b of the zoom ring 14, and a slot 161 and a slot 171 are respectively formed on the roller 16 and the roller 17 at a position corresponding to the rib structure 142 to ensure the alignment of the zoom ring 14 and the rollers 16 and 17. Further, a stop-slip texture 143 is formed on the top surface 14a of the zoom ring 14 to increase the friction force between one's fingers and the top surface 14a. The material of the zoom ring 14 may include, but not limited to, plastic steel material.

In summary, the embodiment or the embodiments of the invention may have at least one of the following advantages. According to the above embodiments, the zoom ring is capable of sliding on the rollers to allow a user to poke the zoom ring more smoothly. Besides, the elastic force of the resilient sheets allows for resilient hand feel when a user pokes the zoom ring. Further, since the rollers are confined to the grooves, such that the rollers do not slip off and the zoom ring does not vibrate when a user pokes the zoom ring. Therefore, the stability in zooming operations could be improved. Also, the top cover together with the holder surround the zoom ring to provide dust-proof protection.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Each of the terms "first", "second", and "third" is only a nomenclature used to modify its corresponding element. These terms are not used to set up the upper limit or lower limit of the number of elements, wherein the element is, for example, a resilient sheet.

What is claimed is:

1. A zooming adjustment mechanism, comprising:
    a holder having at least two grooves;
    a zoom ring confined to the holder and coupled to a zoom bar, wherein the zoom ring has a top surface, a bottom surface opposite the top surface, a first side surface and a second side surface opposite the first side surface;
    at least two rollers respectively confined to the grooves of the holder and in contact with the bottom surface of the zoom ring;
    a first resilient sheet disposed on a first side of the holder, wherein each of the two ends of the first resilient sheet leans against one of the rollers;
    a second resilient sheet disposed on a second side of the holder opposite the first side of the holder, wherein each of the two ends of the second resilient sheet leans against one of the rollers; and
    at least one rib structure formed on the bottom surface of the zoom ring, wherein each of the rollers has at least one slot formed in a position corresponding to the rib structure.

2. The zooming adjustment mechanism as claimed in claim 1, further comprising: a top cover connected with the holder and covering the zoom ring.

3. The zooming adjustment mechanism as claimed in claim 2, wherein the top cover has an opening.

4. The zooming adjustment mechanism as claimed in claim 1, wherein the bottom surface of the zoom ring is complementary to the rollers in shape.

5. The zooming adjustment mechanism as claimed in claim 1, wherein a stop slip texture is formed on the top surface of the zoom ring.

6. The zooming adjustment mechanism as claimed in claim 1, wherein the holder has two stop portions opposite to each other.

7. The zooming adjustment mechanism as claimed in claim 1, wherein the zoom ring comprises plastic steel material.

8. The zooming adjustment mechanism as claimed in claim 1 wherein the zoom ring has an engaging structure engaging with one end of the zoom bar.

9. A projection lens module, comprising:
    a projection lens having a zoom bar; and
    a zooming adjustment mechanism mounted on the projection lens and comprising:
    a holder having at least two grooves;
    a zoom ring confined to the holder and coupled to the zoom bar, wherein the zoom ring has a top surface, a bottom surface opposite the top surface, a first side surface and a second side surface opposite the first side surface;
    at least two rollers respectively confined to the grooves of the holder and in contact with the bottom surface of the zoom ring;
    a first resilient sheet disposed on a first side of the holder, wherein each of the two ends of the first resilient sheet leans against one of the rollers;
    a second resilient sheet disposed on a second side of the holder opposite the first side of the holder, wherein each of the two ends of the second resilient sheet leans against one of the rollers; and
    at least one rib structure formed on the bottom surface of the zoom ring, wherein each of the rollers has at least one slot formed in a position corresponding to the rib structure.

10. The projection lens module as claimed in claim 9, further comprising: a top cover connected with the holder and covering the zoom ring.

11. The projection lens module as claimed in claim 9, wherein the bottom surface of the zoom ring is complementary to the rollers in shape.

12. The projection lens module as claimed in claim 9, wherein a stop-slip texture is formed on the top surface of the zoom ring.

13. The projection lens module as claimed in claim 9, wherein the zoom ring has an engaging structure engaging with one end of the zoom bar.

* * * * *